Feb. 17, 1942.   W. A. REICHEL ET AL   2,273,222
REMOTE MULTIPLE INDICATOR
Original Filed Nov. 15, 1935
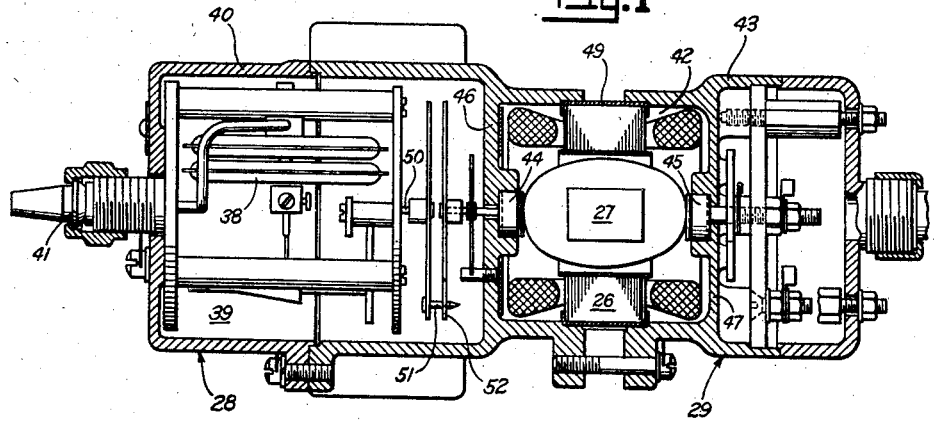
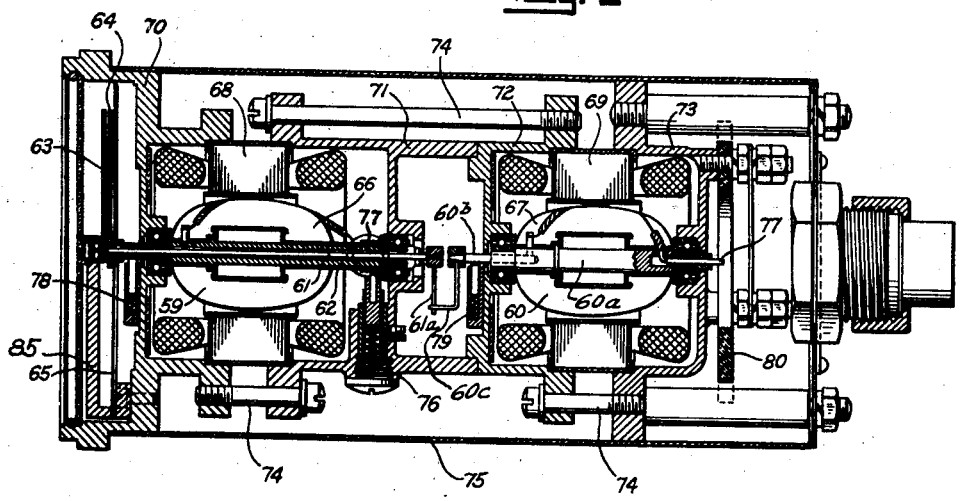
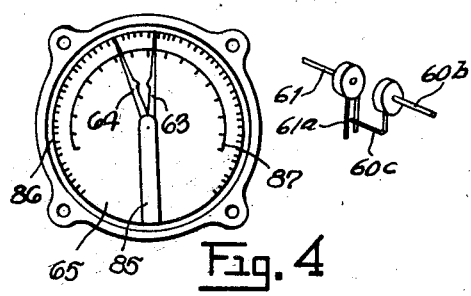
INVENTORS.
Wladimir A. Reichel
Morris F. Ketay
BY Stephen Cerstvik
ATTORNEY.

Patented Feb. 17, 1942

2,273,222

UNITED STATES PATENT OFFICE 2,273,222

REMOTE MULTIPLE INDICATOR

Wladimir A. Reichel, Bellerose, and Morris F. Ketay, Brooklyn, N. Y., assignors to Bendix Aviation Corporation, South Bend, Ind., a corporation of Delaware Original application November 15, 1935, Serial No. 50,024. Divided and this application December 15, 1937, Serial No. 180,039. In France July 22, 1935

7 Claims. (Cl. 177—327)

The present invention relates to indicators, and more particularly to electrically and remotely operated indicators, and is a division of parent case application Number 50,024 filed November 15, 1935, now Patent No. 2,166,610 issued July 18, 1939.

The invention consists essentially in the provision of a novel remotely operated indicator whereby indications of several remotely located measuring devices may be obtained on one dial. To this end, an indicator is provided having a single dial provided with a plurality of scales over which one or more pointers are adapted to move, electrical means for actuating said pointer or pointers, and means whereby said pointer actuating means may be alternately connected to electrical devices operated by various remotely located measuring devices.

In accordance with the invention, several indicators operated by various measuring devices normally employed on an aircraft, for example, as shown in the above issued parent Patent No. 2,166,610, for the purpose of indicating to the pilot the different factors characterizing the operation of the engines of the aircraft, are replaced by a single indicator which may be connected, at will, by the pilot, with remotely located measuring devices of these different factors so as to indicate on a single dial the operating characteristics of one or more engines. The indicator also includes pilot lamps which are so arranged as to be automatically lighted as soon as a given condition or operating function of the engine or engines exceeds a predetermined limit. Thus, the pilot is no longer required to constantly observe the engine instruments showing the operating characteristics of the engine or engines, and can concentrate his attention upon the flight instruments, knowing that the engines are running satisfactorily as long as the pilot lamps of the indicator are not lighted.

The invention will be better understood from the following description and the accompanying drawing which shows one form of apparatus for carrying out the invention.

In the drawing wherein like reference characters refer to like parts:

Fig. 1 is a cross-sectional view of a "Selsyn" or "Autosyn" transmitting motor and a pressure responsive actuator;

Fig. 2 is a cross-sectional view of the two coaxially arranged "Autosyn" or "Selsyn" receiving motors for actuating the pointers of the indicator in accordance with the invention;

Fig. 3 is an enlarged detailed perspective view of the connecting means between the two receiving motors; and Fig. 4 is a front view of the device of Fig. 2.

Fig. 1 illustrates a preferred embodiment of the entire transmitter, including a measuring instrument 28 provided with an electric transmitter 29. As illustrated in this figure, the measuring instrument is of the diaphragm type by which movements are mechanically transmitted to the rotor 27 of the transmitter 29. A diaphragm 38 is located in a chamber 39 formed in a casing 40 joined by means of connection 41 to the pressure to be measured. The transmitter comprising a stator 26 provided with a peripheral shield 49 and a rotor 27 is located in an intermediate chamber 42 formed between the opposite extensions of casing 40 and a box 43 forming an enclosure for the electrical contacts of the transmitter.

As diaphragm 38 expands or contracts in response to the varying pressure condition communicated thereto by way of conduit 41, rockshaft 50 is displaced angularly thereby through a suitable and well-known linkage system. Angular motion of the rock-shaft is transmitted to rotor 27, which is rotatably mounted upon the rotor shaft journalled in bearings 44 and 45 carried by plates 46 and 47, respectively, by way of a link provided with a pin 51 engaging a slot 52 of a parallel link mounted on a spring constrained shaft which, in turn, is connected to and drives the rotor shaft.

In Fig. 2 there is illustrated the construction of one form of multiple indicator embodying the invention and, as shown, comprises two self-synchronous receiving motors 59 and 60 coaxially arranged one behind the other in back of a common dial 65 corresponding to the dial 14 of Fig. 1 of Patent No. 2,166,610 above referred to. Each of said motors 59 and 60 has a rotor 66 and 67, respectively, rotatable about an axis passing through the center of dial 65, and a stator 68 and 69, respectively. The rotors and stators of said motors are mounted on a base comprising supporting elements 70, 71, 72 and 73 assembled together by bolts 74, the entire assembly being enclosed in a casing 75. When desired, receiver motor 60 may be removed from the tandem arrangement with motor 59 by removing casing 75 and disengaging bolts 74 from the supporting elements. The rotor 67 of motor 60 is carried by a shaft 60a which has one of its ends 60b projecting through the wall of supporting member 72, while the rotor 66 of motor 59 is carried by a hollow shaft 62. Another shaft 61 extends through the hollow shaft 62 and carries at its front end a pointer 63, while said hollow shaft 62 carries at its front end a pointer 64. The opposite end of said shaft 61 projects through the wall of supporting member 71. The pointers 63 and 64 correspond to pointers 16 and 17 of Fig. 1 of the above referred to patent and are mounted for rotation about dial 65 and their related scales 86 and 87 (Fig. 4), by their respective shafts 61 and 62. A bracket 85 is secured to the bottom of the supporting member 70 and is adapted for clamping dial 65 in place as shown in Fig. 2 and at its free end carries a suitable bearing for inner shaft 61.

Means are provided for connecting the rotor shaft 60a of motor 60 to the shaft 61 inside of the hollow shaft 62 of motor 59 for actuating the pointer 63 upon rotation of rotor 67 of said motor 60 and, in the form shown in Figs. 2 and 3, said means comprise a fork 61a attached to the projecting end of shaft 61, and a finger 60c carried by the projecting end 60b of shaft 60a of motor 60, said finger having its end disposed between the prongs of the fork 61a. Thus, as rotor 67 of motor 60 rotates in either direction, the finger 60c engages one or the other of the prongs 61a to rotate shaft 61, thereby actuating pointer 63 over dial 65.

The excitation current is furnished to the rotors 66 and 67 by means of brushes 76, only one of which is shown in Fig. 2 for purposes of clarity, cooperating with the contacts 77 provided on the shafts of the rotors, while the opposite end of the excitation windings terminates in friction contacts 78 and 79. Incoming excitation current contacts are connected with the corresponding outlets provided on an insulated panel 80 in back of the instrument, said panel 80 also carrying connections for the outlets of the three-phase windings of the stators.

Although only one embodiment of the invention has been illustrated and described, various changes, which will now appear to those skilled in the art, may be made in the form and relative arrangement of the parts without departing from the scope of the invention. Reference is, therefore, to be had to the appended claims for a definition of the limits of the invention.

What is claimed is:

1. A multiple indicator comprising a dial having a plurality of scales thereon, a pair of concentric pointers cooperating with said scales, a pair of self-synchronous motors arranged coaxially one behind the other in back of said dial and each having a stator and a rotor rotatable about an axis passing through the center of said dial, the motor nearer said dial having a hollow shaft carrying the rotor thereof and connected to one of said pointers for actuating it, a second shaft extending through said hollow shaft and connected to the other of said pointers, a third shaft carrying the rotor of the motor further from said dial, means drivably connecting said third shaft to said second shaft for actuating the other of said pointers and comprising a forked member on one shaft and a finger on the other shaft engaging said forked member, and means holding said motors together in coaxially assembled relation as a single unit.

2. A multiple indicator comprising a dial having scale means thereon, a pair of concentric pointers cooperating with said scale means, a pair of electrical responsive devices arranged coaxially one behind the other in back of said dial and each having a stator and a rotor rotatable about an axis passing through the center of said dial, one of said devices having a hollow shaft carrying the rotor thereof and connected to one of said pointers for actuating the latter, a second shaft extending through said hollow shaft and connected to the other of said pointers, a third shaft carrying the rotor of the other of said devices, means drivably connecting said second and third shafts for actuating the other of said pointers and comprising a forked member on one shaft and a finger on the other shaft engaging said forked member, and means holding said electrical responsive devices in coaxially assembled relation as a single unit.

3. A multiple indicator comprising a dial having scale means thereon, a pair of concentric pointers cooperating with said scale means, a pair of self-synchronous motors arranged one behind the other and each having a stator and a rotor, one of said rotors having a hollow shaft connected to one of said pointers, a second shaft extending through said hollow shaft and connected to the other of said pointers, a third shaft carrying the other of said rotors, means drivably connecting said second and third shafts for actuating said other pointer and comprising a forked member on one shaft and a finger on the other shaft engaging said forked member, and means holding said motors together in assembled relation as a single unit.

4. A multiple indicator comprising a dial having scale means thereon, a pair of concentric pointers cooperating with said scale means, a pair of self-synchronous motors arranged coaxially one behind the other in back of said dial and each having a stator and a rotor rotatable about an axis passing through the center of said dial, the motor nearer said dial having a hollow shaft carrying the rotor thereof and connected to one of said pointers for actuating it, a second shaft extending through said hollow shaft and connected to the other of said pointers, a third shaft coaxial with said second shaft and carrying the rotor of the motor further from said dial, detachable means for drivably interconnecting said third shaft to said second shaft for actuating said other pointer, and means holding said motors together in coaxially assembled relation as a single unit.

5. A multiple indicator comprising a dial having scale means thereon, a pair of concentric pointers cooperating with said scale means, a pair of electrical responsive devices arranged coaxially one behind the other in back of said dial and each having a stator, and a rotor rotatable about an axis passing through the center of said dial, the device nearer said dial having a hollow shaft carrying the rotor thereof and connected to one of said pointers for actuating it, a second shaft extending through said hollow shaft and connected to the other of said pointers, a third shaft coaxial with said second shaft and carrying the rotor of the device further from said dial, and means drivably connecting said second and third shafts for actuating said other pointer and comprising a forked member on one shaft and a finger on the other shaft engaging said forked member.

6. A multiple indicator comprising a dial having scale means thereon, a pair of concentric pointers cooperating with said scale means, a pair of electrical responsive devices arranged coaxially one behind the other in back of said dial and each having a stator, and a rotor rotatable about an axis passing through the center of said dial, the device nearer said dial having a hollow shaft carrying the rotor thereof and connected to one of said pointers for actuating it, a second shaft extending through said hollow shaft and connected to the other of said pointers, a third shaft coaxial with said second shaft and carrying the rotor of the device further from said dial, and detachable means for drivably interconnecting said second and third shafts for actuating said other pointer.

7. A multiple indicator comprising a dial having scale means thereon, a pair of concentric pointers cooperating with said scale means, a pair of electrical responsive devices behind said dial and each having a rotor and a stator, one of said rotors having a hollow shaft connected to one of said pointers for actuating it, a second shaft extending through said hollow shaft and connected to the other of said pointers, a third shaft carrying the other of said rotors, and detachable means for drivably interconnecting said second and third shafts for actuating said other pointer.

WLADIMIR A. REICHEL.
MORRIS F. KETAY.